C. T. HENDERSON.
MOTOR CONTROLLER.
APPLICATION FILED FEB. 4, 1916.
1,306,897.
Patented June 17, 1919.
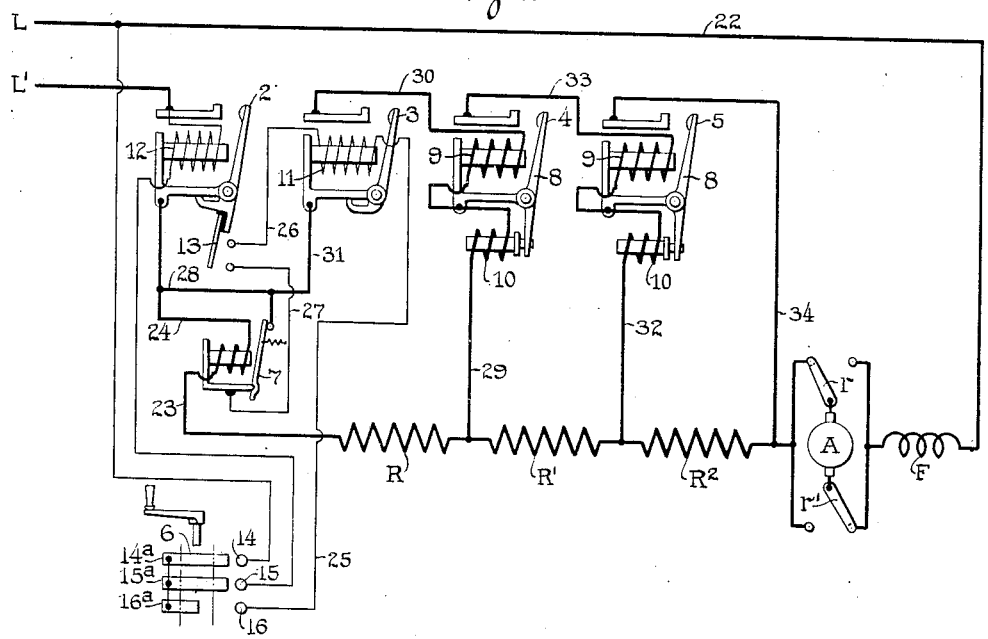

UNITED STATES PATENT OFFICE.

CLARK T. HENDERSON, OF MILWAUKEE, WISCONSIN, ASSIGNOR TO THE CUTLER-HAMMER MFG. CO., OF MILWAUKEE, WISCONSIN, A CORPORATION OF WISCONSIN.

MOTOR-CONTROLLER.

1,306,897.  Specification of Letters Patent.  Patented June 17, 1919.

Application filed February 4, 1916. Serial No. 76,171.

*To all whom it may concern:*

Be it known that I, CLARK T. HENDERSON, a citizen of the United States, residing at Milwaukee, in the county of Milwaukee and State of Wisconsin, have invented new and useful Improvements in Motor-Controllers, of which the following is a full, clear, concise, and exact description, reference being had to the accompanying drawing, forming a part of this specification.

This invention relates to improvements in motor controllers.

In the control of electric motors it has been proposed to employ so-called "lockout" switches with series operating windings for accelerating purposes, said switches effecting acceleration automatically but subject to the current conditions in the motor circuit. Thus while these switches are advantageous for accelerating purposes they practically preclude speed regulation thereby, in view of the impracticability of handling by a master switch the heavy current supplied to the operating windings thereof. Yet certain classes of service, such, for example, as mill and crane service, require both the protection afforded by the "lockout" switches and control for two or more speeds.

This invention has among its objects to provide a controller to meet the aforesaid conditions, namely, the utilization of accelerating switches with series windings and the provision for speed regulation both in accelerating and decelerating.

A further object is to provide a controller which will avoid the difficulties heretofore encountered in employing "lockout" switches with series windings to control plugging resistances for protection of motors in the event of sudden reversals thereof. In this connection it will be apparent that the inrush of current to the motor upon a sudden reversal would greatly exceed the inrush upon starting the motor from a state of rest and it has accordingly been found extremely difficult, if not impossible, to provide a "lockout" switch with a series winding for controlling the plugging resistance and to adjust such switch to lock out under the desired conditions in plugging and close under the proper conditions when starting the motor from rest.

Various other objects and advantages of the invention will hereinafter appear.

The accompanying drawing illustrates certain embodiments of the invention and the same will now be described, it being understood that the invention is not limited to the specific forms illustrated.

In the drawing,

Figure 1 diagrammatically illustrates one form of controller; and,

Fig. 2 diagrammatically illustrates a modification thereof.

Referring first to Fig. 1, the motor 1 to be controlled is shown as of the series type, being provided with an armature A and a series field winding F, although it will be apparent that the controller illustrated is applicable to other types of motors. For controlling the motor, resistances R, R' and R² are provided in series therewith but as will be understood the amount of resistance and the arrangement thereof with respect to the motor may be varied as desired. The several sections of resistance are designed to be included in circuit for one speed of the motor and to be excluded from circuit successively to accelerate the motor to a second higher speed. Further, the section R of the resistance is designed to serve as a plugging resistance upon reversals of the motor, such reversals being effected by any suitable means, such as armature reversing switches $r$ and $r'$.

Referring now to the controlling means, the same includes an electromagnetic main line switch 2, an electromagnetic switch 3 controlling the resistance section R and two "lockout" switches 4 and 5 for controlling the resistances R' and R² respectively. Also, the controller includes a master switch 6 controlling the magnetic switches 2 and 3 and a series relay switch 7 controlling the energizing circuit of the switch 3. Briefly described, the arrangement is such that when the master switch is moved to its first operative position it energizes switch 2, which closes the motor circuit through the several resistances R, R' and R² for low speed, whereas when the master switch is moved to its next operative position it energizes switch 3 subject to governance by the series relay 7 to short-circuit resistance R. Switch 3 in turn completes the circuit of "lockout" switch 4 and the latter upon closing completes the circuit of "lockout" switch 5, thereby effecting automatic acceleration of the motor from low speed to high speed.

Referring now more specifically to the controller, the switches 4 and 5 are of like construction and of a conventional design. Each is provided with a pivoted contactor arm 8 having above its pivot a winding 9 tending to move the same to circuit-closing position and having below its pivot a winding 10 tending to restrain its movement by the winding 9. The windings 9 and 10 are connected in series with one another and at times in series with the motor and are so designed that under normal current conditions the former prevails while under excessive current conditions the latter prevails. Thus the windings of each of these switches carry the full motor current and hence the advisability of so connecting the same that the circuit of switch 5 is closed by switch 4 and the circuit of switch 4 closed by switch 3, as above stated. Switch 3, on the other hand, is provided with a single coil 11 connected across the line whereby the current traversing the same is relatively small and may be safely handled by the master switch 6. As before stated, however, the circuit of switch 3 is controlled by the series relay switch 7. The winding of this relay switch is connected in series with the motor to open said switch and thereby interrupt the energizing circuit of switch 3 upon a predetermined inrush of current. Thus the switch 3 under the control of relay 7 acts similarly to the lockout switches 4 and 5 to control its respective resistance and to protect the motor from untimely removal of said resistance. Further, it will be observed that the action of relay switch 7 being dependent only upon one winding, or in other words, upon only one magnetic force, may be readily adjusted to permit the switch 3 to close under the desired conditions in starting the motor from rest and to arrest the response of switch 3 under the desired conditions upon reversal of the motor.

The main line switch 2 is similar to switch 3, being provided with a single shunt winding 12 controlled by the master switch 6 and immediately responsive thereto. Also, the switch 2 is provided with an auxiliary switch 13 in circuit with the operating winding of switch 3 whereby said latter switch can only respond when switch 2 is closed. This, as will be apparent, provides an interlock between the main switch and the several resistance switches whereby reinsertion of all of the resistance is insured upon opening of the motor circuit.

The master switch, as shown, comprises three contact fingers 14, 15 and 16 and three connected segments 14$^a$, 15$^a$ and 16$^a$, the first two being adapted to bridge contact fingers 14 and 15 in the first operative position of the master switch and segments 14$^a$ and 16$^a$ being adapted to bridge fingers 14 and 16 upon movement of the master switch to its second operative position.

More specifically describing the operation and functions of the controller, movement of the master switch completes circuit from line L to master switch contact 14 across segments 14$^a$ and 15$^a$ to contact 15, by conductor 21 through the operating winding 12 of switch 2 to line L'. This effects response of switch 2 to complete the motor circuit.

The motor circuit may be traced from line L by conductor 22 through the series field winding F and thence through the armature in one direction or the other according to the positions of the switches $r$ and $r'$, thence through the resistances R$^2$, R' and R in series, by conductor 23 through the winding of relay switch 7, by conductor 24 through the switch 2 to line L'. Thus the motor is started with all of the resistance in circuit and in consequence will operate at slow speed until the master switch is thrown to the second position.

Movement of the master switch to the second position completes circuit as already traced from line L to master switch contact 14, thence to contact 16 by conductor 25 through the winding 11 of switch 3, by conductor 26 through the auxiliary contacts 13 of switch 2, by conductor 27 through relay switch 7, by conductors 28 and 24 through switch 2 to line L'. This energizes switch 3 subject, however, to response of relay switch 7 under excessive current conditions.

Switch 3 upon closing short-circuits resistance R and more specifically establishes circuit from the left hand terminal of resistance R' by conductor 29 through the two windings 10 and 9 of switch 4 in series, by conductor 30 through said switch 3, by conductors 31, 28 and 24 to switch 2 and line L'. Thus it will be observed that the switch 3 also short-circuits the series relay 7 and includes in the motor circuit the windings of switch 4.

Switch 4 will accordingly respond, subject, however, to delay during abnormal current conditions and upon responding will short-circuit resistance R' and its holdout winding 10. More specifically, it will complete circuit from the left hand terminal of resistance R$^2$ by conductor 32 through the two windings 10 and 9 of switch 5, by conductor 33 through its switch arm 8, thence through its magnet frame and its winding 9 to conductor 30 and thereafter through switches 3 and 2 as already traced to L'.

Switch 5 now having its winding connected in circuit will automatically respond as soon as current conditions permit and upon responding will short-circuit resistance R$^2$ and its holdout winding 10. More specifically, it will complete circuit from the right hand terminal of resistance R² by conductor 34 through its switch arm 8 and its magnet frame to its winding 9 and thence through switches 4, 3 and 2, as already traced to line L'.

The exclusion of the several steps of resistance is thus entirely automatic after movement of the master switch to second position and conversely deceleration of the motor is automatic upon movement of the master controller from second to first position. The latter obviously effects deënergization of switch 3, which in turn deënergizes switch 4 and accordingly switch 5. Hence if the motor be running at high speed, and it is desired to reduce the speed thereof without stopping, this can be readily effected by merely moving the master switch back to its first operative position. On the other hand, if it is desired to stop the motor the master switch is moved to off position, whereupon it also deënergizes switch 2, thereby disconnecting the motor from circuit.

Assuming now that the motor is in operation in one direction and is suddenly reversed. Then, as will be understood all of the switches 2, 3, 4, and 5 would be momentarily opened and upon reclosure of the motor circuit the series relay 7 would respond to the heavy inrush of current, thereby temporarily preventing reclosure of switch 3 and in consequence preventing reclosure of switches 4 and 5 until the inrush of current was reduced to a safe point.

While, as above stated, the provision of a separate series relay in connection with the switch 3 is advantageous, it would be possible to provide said switch with a series holdout coil, as illustrated in Fig. 2, to mechanically act similarly to the holdout coil of switches 4 and 5. More specifically referring to Fig. 2 the switch 3 is provided with a shunt coil 11, as in Fig. 1, and with a series coil 35 acting upon an extension of its switch arm as in switches 4 and 5. Thus the switch would be readily controllable by the master switch and the operating winding being connected across the line would have a constant pull which would simplify the adjustment of the holdout coil 35 for protection in plugging and for release of the switch 3 under the desired conditions upon starting the motor from rest.

Except for the elimination of the series relay switch and the connection of the winding 35 between the switch 3 and the resistance R, the layout shown in Fig. 2 is the same as that shown in Fig. 1 and accordingly requires no further description.

While the controller illustrated provides for only two speeds of the motor, it is obvious that it might readily be modified to provide for additional speeds and furthermore it will be apparent that the invention may be advantageously employed where other forms of "lockout" switches with series windings are involved.

What I claim as new and desire to secure by Letters Patent is:

1. In a motor controller, in combination, a plurality of electro-responsive switches including a switch to control the continuity of the motor circuit, certain of said switches being shunt wound and certain being series wound and the latter being subject to control by the former, means controlled by certain of said switches to enable operation of the motor at any one of a plurality of speeds according to the setting of said switches and a master switch controlling all of said switches through the medium of those having shunt windings for control of the continuity of the motor circuit and for increasing or decreasing the speed of operation of the motor at will for speed selection.

2. In a motor controller, the combination with a plurality of electro-responsive switches including a shunt wound switch to control the continuity of the motor circuit, a series wound accelerating switch and a shunt wound switch controlling said accelerating switch, of connections rendering the response of the second mentioned shunt wound switch dependent upon prior response of the first mentioned shunt wound switch and a master switch controlling said shunt wound switches for effecting operation of the motor with all of said switches closed for one speed or with said series wound switch open for another speed.

3. In a motor controller, in combination, a plurality of electro-responsive switches including a switch to control the continuity of the motor circuit and switches for accelerating the motor, certain of said switches being shunt wound and certain being series wound, the latter being subject to control by the former and also to control by the current conditions in the motor circuit for insuring against response thereof under excessive current conditions and a master switch controlling said shunt wound switches and through the medium thereof also controlling said series wound switches to provide for the selection of any one of a plurality of motor speeds.

4. In a motor controller, in combination, a plurality of electromagnetic accelerating switches, certain of the same having windings subjected to the motor current to operate the same under normal current conditions and lockout the same under abnormal current conditions and another of said switches having a winding independent of the motor current and means associated with said last mentioned switch to lock out the same under abnormal current conditions in the motor circuit.

5. In a motor controller, in combination, an electromagnetic accelerating switch responsive to the motor current but inoperative under excessive current conditions, a second accelerating switch controlling said first mentioned switch, said second mentioned switch having an operating winding independent of the motor current and means responsive to the motor current to arrest its operation and a master switch for directing the operation of said second mentioned switch subject to retardation by the aforesaid means.

6. In a motor controller, in combination, an electromagnetic switch controlling the continuity of circuit of the motor, a plurality of progressively operating accelerating switches, certain of said accelerating switches having series windings for effecting operation thereof and also effecting lockout under abnormal current conditions and said first mentioned switch and another of said accelerating switches having shunt operating windings, a master switch directing the operation of said shunt winding switches and means associated with said shunt accelerating switch to arrest the operation thereof under excessive current conditions in the motor circuit.

In witness whereof, I have hereunto subscribed my name.

CLARK T. HENDERSON.